United States Patent Office 3,098,768
Patented July 23, 1963

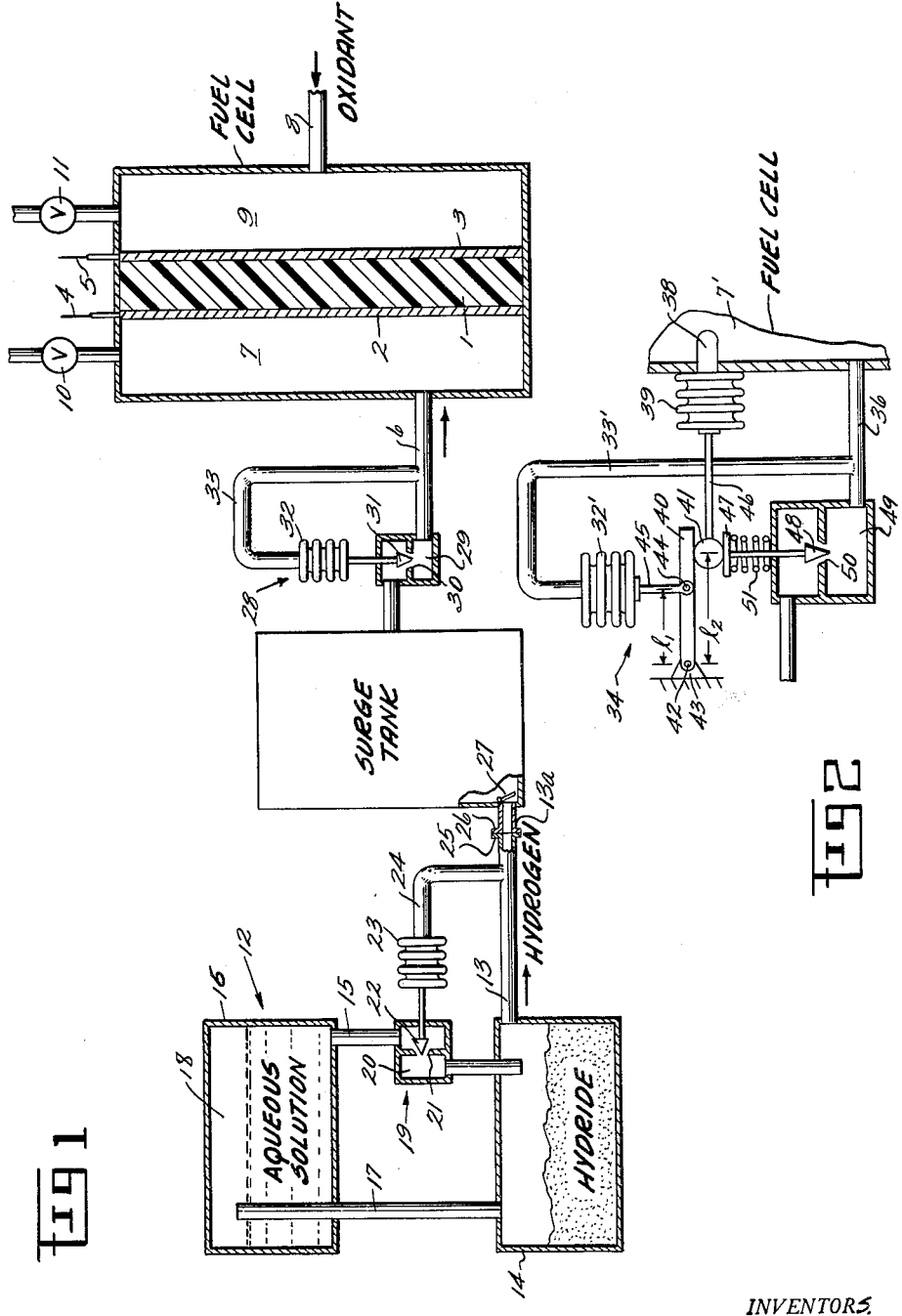

3,098,768
FUEL GAS SYSTEM FOR FUEL CELLS
William Alexander Titterington, Lynnfield Center, and Richard Hardin Blackmer, Topsfield, Mass., assignors to General Electric Company, a corporation of New York
Filed Dec. 23, 1959, Ser. No. 861,704
7 Claims. (Cl. 136—86)

This invention relates to fuel gas systems for fuel cells, and more particularly to an improved system for supplying fuel gas at a controlled rate to a fuel cell, for example the kind shown and described by U.S. Patent No. 2,913,511 to Willard T. Grubb, Jr., entitled "Fuel Cell," which was issued November 17, 1959, and assigned to the assignee of the present application.

A fuel cell having a solid ion exchange electrolyte membrane is disclosed by the aforementioned Grubb patent, and this type of cell will hereinafter be referred to as a "solid electrolyte fuel cell" for convenience. According to the patent, an ion exchange resin membrane is placed between and in contact with a pair of permeable electrodes having catalytic properties, one of which may be exposed to an oxidant and the other to a fuel gas, for example, hydrogen. In the case of a cationic membrane, ionization of the fuel gas occurs at the anodic electrode, with the migration of electrons between the electrically connected electrodes to establish an electric current, and the migration of positively charged ions through the membrane to combine with the oxidant and free electrons at the cathodic electrode.

The rate of consumption of fuel gas by the fuel cell depends upon the rate of electric current generation, or current density over the surface of the membrane; and the density (and pressure, at a given temperature) of the fuel gas in the cell at constant volume therefore also depends upon the rate of current generation. In order to maintain a current as required by a fixed or varying external load, it is necessary to maintain a rate of fuel gas supply to the fuel cell sufficient to offset a decrease in density of varying rate, caused by a varying rate of absorption of the fuel gas into the membrane.

A convenient supply of fuel gas for the fuel cell is a generator comprising means for mixing suitable reactants at a controlled rate. For example, hydrogen gas may be liberated from hydride or borohydride materials by mixing an aqueous solution with them at a controlled rate.

In practice, several problems exist in the use of a fuel gas generator system of this type in connection with a fuel cell. First, there is a material lag in the response of the generator to a requirement for an increased rate of fuel gas flow, because changes in the reaction rate lag behind changes in the rate of feed of reactants; that is, the transient response is slow. Second, the reaction rate of the generator is generally somewhat irregular, resulting in an irregular pressure of the gas supply. Third, the reaction continues for a time after gas consumption by the fuel cell and mixing of reactants is discontinued, as when current generation is interrupted. Finally, the system does not provide for continuation of fuel cell operation during such times as the gas-generating reactants are being replenished.

It is an object of this invention to provide a fuel gas system which is operative to regulate the supply of gas to a fuel cell from a generator within a preselected range of pressure or density, such that the pressure is not subject to variations caused by the reaction lag time and irregular reaction rate of the generator, and is controlled with improved transient response.

It is a further object of this invention to provide a fuel gas system which is operative to supply a fuel cell with gas within a uniform range of pressure or density at all times, including periods during which the gas generator is removed from the system for replenishment of the reactants.

In carrying out these and other objects, we provide a surge tank for receiving and storing fuel gas from the generator, and for supplying the stored gas to the fuel cell. The surge tank preferably has at least sufficient storage capacity to supply the fuel cell adequately during the interval between commencement of operation of the system and the initial generation of fuel gas, to store gas generated subsequent to interruption of operation of the system, and to supply the fuel cell during removal and replenishment of the generator. The surge tank may be of a fixed or variable volume.

In this system, maintenance of current generation as required by a fixed or varying external electrical load supplied by the fuel cell requires that the rate of gas supply from the surge tank to the fuel cell be maintained at a level sufficient to offset a decrease in gas density of varying rate caused by a varying rate of consumption of the gas; and also requires that the reaction rate of the fuel gas generator be maintained at a level sufficient to offset a corresponding decrease in gas density in the surge tank.

It is a further object of this invention to provide a fuel gas generator control system which is operative to control the flow of gas from a surge tank such as to maintain a preselected range of pressure or density of gas in a fuel cell whose gas consumption rate is subject to variation, and which is further operative to control the reaction rate of a fuel gas generator to maintain a preselected range of pressure or density of fuel gas in the surge tank.

Briefly stated, we carry out our invention in one embodiment thereof by placing a surge tank in serial fuel gas flow relation between a generator and a fuel cell, and by providing means for controlling the flow of gas from the surge tank to the fuel cell in response to the pressure obtaining in a fuel gas chamber of the fuel cell, in such manner as to maintain a preselected range of pressure in the chamber although the fuel cell exhibits a varying gas consumption rate. Means are also provided for controlling the reaction rate of the fuel gas generator in response to the pressure obtaining in the surge tank, which is supplied by the generator, in such manner as to maintain a preselected range of pressure in the surge tank. We prefer not to compensate for the partial variation in pressure attributable to temperature changes in the fuel gas, because pressure is a practical parameter for control of density under ordinary working conditions of relatively uniform temperature. Under conditions of widely fluctuating temperatures, however, we provide temperature compensation for the control means, in order to control density directly.

While the specification concludes with claims particularly pointing out and distinctly claiming the subject matter which we regard as our invention, it is believed that the invention will be better understood from the following description taken in connection with the accompanying drawing, in which:

FIG. 1 is a schematic representation of a fuel gas system for a fuel cell, according to a preferred embodiment of our invention; and FIG. 2 is a schematic representation of a fragmentary portion of the system of FIG. 1, modified for temperature compensation of one of the control means.

Referring to FIG. 1, a fuel cell made according to the aforementioned Grubb Patent No. 2,913,511 is provided, comprising an ion exchange membrane 1 positioned between and in electrical contact with catalytic electrodes 2 and 3. Leads 4 and 5 connected to electrodes 2 and 3, respectively, are used to deliver electrical current supplied by the cell to some electrical apparatus. Fuel gas is supplied to electrode 2 through conduit means 6 and chamber 7. A valved outlet 10 is provided from chamber 7 to exhaust any impurities which enter the chamber from the fuel gas or any inert materials which are a product of reaction of the fuel gas. The oxidant gas, which may be oxygen or air, is admitted into chamber 9 through conduit means 8. Chamber 9 contains a valved outlet 11 for the withdrawal of impurities in the oxidant gas. Thus, where the oxidant is air, outlet 11 is employed to remove the nitrogen which builds up in chamber 9.

By way of example, the membrane 1 may be a cation permeable membrane, having H+ ions as the mobile ion, and the fuel gas may be hydrogen and the oxidant air. In this case the overall cell reaction is the oxidation of hydrogen to water. In this reaction, gaseous molecular hydrogen is ionized at electrode 2, with hydrogen ions migrating to electrode 3 through membrane 1, and electrons migrating to electrode 3 through electrode 2 and an external load connected to leads 4 and 5.

The rate of consumption of fuel gas by the fuel cell depends upon the external load and the rate of current generation, which may be fixed or varying. In order to maintain a rate of current generation according to demand, the rate of supply of fuel gas to chamber 7 must be controlled so as to maintain the density of fuel gas within limits which are experimentally determined. According to our invention, the rate of supply of fuel gas to the fuel cell through conduit means 6 from a surge tank is controlled in response to the pressure in the conduit means, to maintain the gas density within the desired limits. A fuel gas generator generally designated 12 supplies fuel gas to the surge tank through further conduit means 13. The rate of fuel gas supply is regulated by controlling the rate of mixing of gas-generating reactants in response to the pressure in conduit 13, to maintain the gas density within desired limits. In the embodiment shown in FIG. 1, generator 12 is provided for the generation of hydrogen as a fuel gas, by decomposition of solid hydrides or borohydrides contained in a tank 14. The nature of such reactions are well known and are described, e.g., on pages 88 and 89 of Status Report on Fuel Cells, by B. R. Stein (ARO Report No. 1, June 1959), published by the United States Department of Commerce, Office of Technical Services. The decomposition process is carried out by releasing an aqueous solution at a controlled rate into tank 14 through a tube 15 from a tank 16. A vent pipe 17 extends from tank 14 into a gas space 18 within tank 16, in order to establish pressure equilibrium for even flow of aqueous solution between the tanks. Tank 14 is connected in fuel gas flow relation with the surge tank by conduit means 13, for flow of hydrogen in the direction shown by the arrow.

For controlling the reaction rate of generator 12, we provide pressure-responsive reaction control means generally designated 19. These control means include a valve chamber 20 placed in serial flow relation in tube 15, forming a flow-control orifice 21. Flow of aqueous solution through the orifice is regulated by a conical valve body 22, secured to a conventional pressure-responsive bellows 23. Bellows 23 is placed in pressure communication with conduit means 13 by a branch conduit 24. By these means, the hydrogen generation reaction rate is controlled by regulating the flow of aqueous solution to hydride tank 14, in such manner as to maintain hydrogen pressure in the surge tank within a range predetermined by the physical constants of the apparatus.

Means are provided for the removal of generator 12 from the system for the replenishment of the reactants, without interruption of fuel cell operation. These means include mating flanges 25 and 26, formed about conduit 13 at an interruption 13a therein. A quick-disconnect coupling (not shown) of any suitable type is used to join the flanges in gas-sealing relationship, and to facilitate removal of the generator. A one-way flapper valve 27 is positioned at the junction of conduit 13 with the surge tank, to retain hydrogen pressure for operation of the fuel cell during periods of generator removal.

The apparatus thus far described provides a supply of fuel gas which is immediately available for fuel cell utilization at all times, including those periods when generator 12 is removed for the replenishment of reactants. However, the time lag in gas generation by generator 12 in response to modulation by control means 19 is substantial, with the result that transient response is slow. Our invention provides for the range of pressures and densities in the surge tank to be greater than is necessary for optimum fuel cell operation, and for pressure reduction and modulation of the gas supplied to the fuel cell. The greater pressure and density of the fuel gas in the surge tank permits pressure-reducing control means to be utilized to maintain a relatively narrow range of pressures and densities in the fuel cell, and to provide improved transient response.

These pressure-regulating control means, generally designated 28, are interposed between the surge tank and the fuel cell, in conduit means 6. Control means 28 includes a valve chamber 29 placed in serial flow relation in conduit means 6, forming a flow-control orifice 30. A conical valve body 31 is secured to a pressure-responsive bellows 32 for regulation of the orifice area. Bellows 32 is subjected to the pressure obtaining in conduit 6 by means of a branch conduit 33. By these means, gas pressure in chamber 7 is maintained within pre-selected limits, and is not subject to fluctuations occurring in the surge tank. This system is effective to maintain the density of hydrogen in the fuel cell within a preselected range, with an improved transient response characteristic.

In the majority of applications, this system controls the range of density with sufficient accuracy, although it is responsive only to pressure variations, because the temperature variations encountered are too small to produce material partial pressure variations.

However, in those applications in which a wide range of temperatures are encountered, we provide temperature compensation means for the control means to regulate the flow of hydrogen in direct response to its density, rather than pressure as an approximation of density. These means are shown in FIG. 2, in which parts similar to those of FIG. 1 are similarly numbered, with prime superscripts. Density of a gas is inversely proportional to its absolute temperature, and directly proportional to its pressure. The temperature-compensated pressure-responsive control means selected is a conventional dividing arrangement, generally designated 34, affording an output movement which is the result of the division of a pressure signal by a temperature signal. A pressure-responsive bellows 32' is subjected to the pressure obtaining in conduit means 6' which is connected with a fuel cell chamber 7', by means of a branch conduit 33'. A temperature-responsive gas bulb 38 extends into chamber 7', and communicates with a bellows 39. In order to divide control movements of bellows 32' by those of bellows 39, a variable lever arm linkage is provided, comprising a pivoted arm 40 and a ball pivot 41. Arm 40 is pivoted at 42 to a stationary support 43, and pivoted at 44 to a drive rod 45 secured to bellows 32'. Ball 41 is drivingly connected with bellows 39 by means of a rod 46, for movement in a horizontal line lying in the plane of FIG. 2, and is interposed between arm 40 and an enlarged head 47 of a conical valve body 48. A valve chamber 29' is interposed in conduit 6', and forms an orifice 30' whose area is regulated by valve body 48. Compression spring 51 urges head 47 into engagement with ball 41. It will be apparent that movement of valve body 48 will be proportioned to movement of bellows 32' according to the ratio of $l_1$ to $l_2$, the distances from pivot 42 to their respective fulcrums with arm 40. Length $l_2$ is varied in inverse proportionality to the absolute temperature of the hydrogen in chamber 7'. The physical constants of the control means are proportioned such that the movement of the valve body will be in response to density of the hydrogen, rather than to its pressure. This arrangement affords more precise response to density of the fuel gas, and thus to the rate of gas absorption by the fuel cell.

It will be apparent from the foregoing description that we have provided an improved fuel gas system for fuel cells, which is operative in response to pressure or density, as desired, to maintain within a predetermined range the density of fuel gas in a fuel cell which is subject to a variable fuel gas consumption rate; which provides improved transient response to the varying fuel gas consumption rate of the fuel cell; which is operative to supply fuel gas to the fuel cell during periods of removal and replenishment of the gas generator; and which provides a fuel gas supply whose pressure is not subject to variations caused by reaction lag times and irregularities of the reaction rate of the gas generator.

While we have illustrated and described particular embodiments of our invention, it will be apparent to those skilled in the art that various modifications may be made without departing from the spirit and scope of the invention. For example, various fuel gases other than hydrogen may be utilized, as described by the aforementioned Grubb Patent No. 2,913,511. Furthermore, various conventional pressure-responsive control means and temperature-compensation means may be utilized, other than those which have been described by way of example.

In addition, the present invention is not limited in usefulness to the ion exchange membrane type fuel cell but is equally suitable for use in all other gas consuming types.

What we claim as new and desire to secure by Letters Patent of the United States is:

1. A fuel gas system for a fuel cell comprising, in combination; a fuel gas generator comprising means for mixing fuel gas-generating reactants and valve means operable to vary the rate of mixing of the reactants; a surge tank connected in fluid flow relation with said generator for receiving fuel gas generated thereby; a fuel cell comprising a pair of electrodes and an electrolyte positioned between and in contact with said electrodes, said fuel cell adapted to consume fuel gas; conduit means connecting one of said electrodes in fuel gas flow relation with said surge tank; and pressure-regulating control means operable in response to the pressure of fuel gas in said conduit means, said control means operative to regulate the rate of flow of fuel gas in said conduit means such as to maintain a preselected range of pressures of the fuel gas supplied to said one of said electrodes.

2. A fuel gas system for a fuel cell as recited in claim 1, together with further control means operable in response to the pressure of fuel gas in said surge tank, said further control means operatively connected with said valve means to regulate the rate of mixing of the reactants such as to maintain a preselected range of pressures of the fuel gas in said surge tank.

3. A fuel gas system for a fuel cell as recited in claim 1, together with compensating means operable in response to the temperature of said fuel gas in said conduit means and operatively connected for modulation of said pressure-regulating control means to regulate the rate of flow of fuel gas in said conduit means such as to maintain a preselected range of densities of the fuel gas supplied to said one of said electrodes.

4. A fuel gas system for a fuel cell comprising, in combination: a fuel gas generator including tube means for mixing fuel gas-generating reactants; valve means operable to vary the rate of mixing of the reactants; a surge tank connected in fluid flow relation with said generator for receiving fuel gas generated thereby; a fuel cell comprising a pair of electrodes and an electrolyte positioned between and in contact with said electrodes, said fuel cell adapted to absorb fuel gas; conduit means connecting one of said electrodes in fuel gas flow relation with said surge tank; a first valve chamber in said conduit means forming an orifice therein; a first valve body operable in cooperation with said orifice to vary the flow of fuel gas through said conduit means; and a first bellows in fluid communication with said one of said electrodes; said first bellows operatively connected with said first valve body to regulate the rate of flow of fuel gas in said conduit means such as to maintain a preselected range of pressures of the fuel gas supplied to said one of said electrodes.

5. A fuel gas system for a fuel cell as recited in claim 4, said valve means comprising a second valve chamber in said tube means forming an orifice therein, and a second valve body operable in cooperation with said orifice to vary the rate of mixing of the reactants; together with a second bellows in fluid communication with the fuel gas in said surge tank, said second bellows operatively connected with said second valve body to regulate the rate of mixing of the reactants such as to maintain a preselected range of pressures of the fuel gas in said surge tank.

6. A fuel gas system for a fuel cell comprising, in combination: a fuel cell comprising a pair of electrodes and an electrolyte positioned between and in contact with said electrodes, said fuel cell adapted to absorb fuel gas; a surge tank; conduit means connecting one of said electrodes in fuel gas flow relation with said surge tank; pressure-regulating control means operable in response to the pressure of fuel gas in said conduit means, said control means operative to regulate the rate of flow of fuel gas in said conduit means to maintain a preselected range of pressures of the fuel gas supplied to said one of said electrodes; a fuel gas generator comprising tank means for mixing fuel gas-generating reactants; further conduit means removably connecting said generator for supply of fuel gas therefrom to said surge tank, and for removal from the system of said generator for replenishment of the reactants in said tank means; and one-way valve means operable by fuel gas pressure in said surge tank to prevent escape of fuel gas from said surge tank through said further conduit means upon removal of said generator.

7. A fuel gas system for a fuel cell comprising, in combination: a fuel cell adapted to consume fuel gas; a surge tank connected in fuel gas flow relation with said fuel cell; control means responsive to the pressure of fuel gas in said fuel cell for regulating the flow of fuel gas from said surge tank to said fuel cell; a fuel gas generator comprising means for mixing fuel gas-generating reactants and valve means operable to vary the rate of mixing of the reactants; said surge tank connected in fuel gas flow relation with said generator; and reaction control means operable in response to fuel gas pressure in said surge tank to actuate said valve means to initiate mixing of the reactants when the gas pressure in said surge tank falls below a preselected range, and to discontinue mixing of the reactants when the gas pressure in said surge tank exceeds the preselected range.

References Cited in the file of this patent
UNITED STATES PATENTS

| | | |
|---|---|---|
| 1,315,268 | Wise | Sept. 9, 1919 |
| 2,384,463 | Gunn et al. | Sept. 11, 1945 |
| 2,721,789 | Gill | Oct. 25, 1955 |
| 2,913,511 | Grubb | Nov. 17, 1959 |
| 2,925,455 | Eidensohn et al. | Feb. 16, 1960 |
| 3,014,976 | Blackmer | Dec. 26, 1961 |